United States Patent
Brilka

[11] Patent Number: 5,838,395
[45] Date of Patent: Nov. 17, 1998

[54] IF DEMODULATOR CIRCUIT WITH VARIABLE IF GAIN CONTROL

[75] Inventor: Joachim Brilka, Hamburg, Germany

[73] Assignee: U.S. Philips Corporation, NY, N.Y.

[21] Appl. No.: 787,598

[22] Filed: Jan. 22, 1997

[30] Foreign Application Priority Data

Jan. 23, 1996 [DE] Germany .................. 196 02 187.1

[51] Int. Cl.⁶ .................................................. H04N 5/44
[52] U.S. Cl. ........................................ 348/726; 348/727
[58] Field of Search .................................. 329/347–371; 348/726, 727, 673, 678–689

[56] References Cited

U.S. PATENT DOCUMENTS 4,500,922  2/1985  Van Roessel .
4,885,546  12/1989  Araki .
5,272,531  12/1993  McGinn .

OTHER PUBLICATIONS

Datasheet #TDA 9815—Multistandard/MAC VIF–PLL With QSS–IF And Dual FM–PLL/AM Demodulator, Mar. 1994.

*Primary Examiner*—Nathan J. Flynn
*Attorney, Agent, or Firm*—Steven R. Biren

[57] ABSTRACT

An IF demodulator circuit with IF gain control at a variable time constant, which receives an IF carrier including synchronizing pulses, a black porch and picture information with a positively modulated picture signal, in which the IF picture signal is amplified to a nominal amplitude value by the gain control, and which includes an IF demodulator (3) which demodulates the IF picture signal and supplies a picture signal from the output, while, for a gain control which is independent of DC offsets that may occur in the picture signal, the demodulator circuit is constructed in such a way that a black level detector (8) for generating a black level signal used as a threshold value signal in conformity with the amplitude value of the black porch of the picture signal supplied by the amplitude demodulator (3) is provided, that a DC offset circuit (4) is provided, which raises the DC component of the picture signal and/or lowers the DC component of the threshold value signal in such a way that both signals are offset by a predetermined value relative to each other, that a comparator circuit (7) is provided which receives the two signals which are offset relative to each other, in which signals the comparator circuit compares the voltage value of the synchronizing pulses occurring in the picture signal with the voltage value of the threshold value signal, and that the comparator circuit (7) supplies a comparison signal in dependence upon this comparison, in dependence upon which comparison signal the time constant of the gain control is changed.

10 Claims, 3 Drawing Sheets

IF DEMODULATOR CIRCUIT WITH VARIABLE IF GAIN CONTROL

BACKGROUND OF THE INVENTION

1. Field of the Invention

The invention relates to an IF demodulator circuit with IF gain control at a variable time constant, which receives an IF carrier comprising synchronizing pulses, a black porch and picture information with a positively modulated picture signal, in which the IF picture signal is amplified to a nominal amplitude value by means of the gain control and which comprises an IF demodulator which demodulates the IF picture signal and supplies a picture signal from the output.

2. Description of the Related Art

Television tuners in picture display devices generally convert the received picture signal to an IF range for the purpose of receiving television signals. In this IF range, the picture signal is modulated on an IF carrier. Dependent on the television standard, this picture signal may be modulated positively or negatively. Positively modulated means that the picture contents of the picture signal towards larger white amplitudes lead to a larger modulation amplitude of the IF carrier. Conversely, synchronizing pulses in the picture signal lead to a small or unavailable modulation amplitude of the IF carrier. Such a positive modulation is provided, for example, for picture signals of the SECAM-L standard.

A problem in such positively modulated IF picture signals is that a gain control in the IF range cannot readily be oriented on the picture signal because the maximum modulation amplitude is dependent on the white component of the picture contents. This would lead to a gain control which is dependent on the picture contents. This is undesirable. Therefore, the white reference pulse (100% carrier) which is present in each vertical blanking interval is used for gain control. This interval lasts approximately 10 µs at a repetition period of 20 ms, so that a peak value detector having a relatively large time constant must be used for the control, which leads to a very slow AGC.

In an integrated IF circuit from the Philips company (type TDA 9815) the black level of the picture signal is detected and compared with a fixed reference voltage so as to avoid this problem. This reference voltage corresponds to the nominal black level of a picture signal with a nominal amplitude minus 6 dB relative to the "carrier zero value" (synchronizing value). Dependent on the result of this comparison, the AGC time constant is switched to a larger or smaller value. However, this has the problem that the DC component of the picture signal in the integrated circuit may fluctuate by approximately ±100 mV relative to the synchronizing value, caused by the offset of the video demodulator. The black level, which is compared with the reference voltage, then also has a DC offset of approximately ±70 mV. This in turn has the result that the comparison of the detected black level with the fixed reference voltage leads to deviating results in dependence upon this DC offset. The variation of the time constant with which the gain control is carried out is thus dependent on the DC offset. Dependent on the DC offset, there is sooner or later a switch-over to a shorter or longer time constant. This effect is undesirable.

SUMMARY OF THE INVENTION

It is an object of the invention to provide an IF demodulator circuit of the type described in the opening paragraph, in which circuit the variation of the time constant of the gain control is independent of a circuit-internal DC offset of the picture signal. Moreover, the control should be independent of the picture contents.

According to the invention, this object is solved in that a black level detector for generating a black level signal used as a threshold value signal in conformity with the amplitude value of the black porch of the picture signal supplied by the amplitude demodulator is provided, in that a DC offset circuit is provided, which raises the DC component of the picture signal and/or lowers the DC component of the threshold value signal in such a way that both signals are offset by a predetermined value relative to each other, in that a comparator circuit is provided which receives the two signals which are offset relative to each other, in which signals the comparator circuit compares the voltage value of the synchronizing pulses occurring in the picture signal with the voltage value of the threshold value signal, and in that the comparator circuit supplies a comparison signal in dependence upon this comparison, in dependence upon which comparison signal the time constant of the gain control is changed.

The IF picture signal applied to the IF amplifier circuit is received as a picture signal by a black level detector after amplitude demodulation. This detector detects the amplitude of the black porch which is comprised in the picture signal. This black level signal is subsequently used as a threshold value signal.

Moreover, a DC offset circuit is provided which offsets the picture signal applied to the circuit and the threshold value signal relative to each other. Thus, a variation of the DC component of one signal or of the two signals is realized. In this case, it is important that the two signals are offset relative to each other by a predetermined value. This is effected in such a way that the DC component of the picture is increased and/or the DC component of the threshold value signal is decreased. Independent of the fact whether the two signals or only one of the signals is varied in its DC component, the signals should always be offset relative to each other by the predetermined value.

These two signals, which are offset relative to each other as regards their DC components, i.e., the offset picture signal and the offset threshold value signal, are applied to a comparator circuit which compares the voltage value of the threshold value signal with the voltage value of the synchronizing pulses occurring in the offset picture signal. Dependent on whether these synchronizing pulses have a larger or smaller value as a voltage value of the threshold value signal, the comparator circuit supplies a varying comparison signal.

This comparison signal thus indicates whether the synchronizing pulses in the offset picture signal have a larger or smaller voltage value amplitude than the offset threshold value signal. Dependent on this comparison, the time constant of the gain control, by which the gain of the IF signal is controlled in such a way that the picture signal has a nominal amplitude after the amplitude demodulator, is changed.

This circuit arrangement particularly has the advantage that the variation of the time constant of the gain control is not dependent on a DC offset of the picture signal. This is caused by the fact that signals applied in the comparator circuit are derived from the video output signal of the amplitude demodulator. DC offsets of this picture signal then have a similar effect in the two signals so that the relative comparison of these signals is only slightly influenced by a DC offset of the picture signal. Since, exclusively, the voltage values of the synchronizing pulses or of the black porches of the picture signal are evaluated, the picture signal is in no way dependent on the picture contents.

In accordance with an embodiment of the invention, the DC offset circuit offsets the threshold value signal and the picture signal relative to each other by half the nominal amplitude of the synchronizing pulses.

For changing the variable time constant of the gain control, it has proved to be advantageous to offset the threshold value signal relative to the picture signal by half the nominal amplitude of the synchronizing pulses, i.e., by half the nominal amplitude of the synchronizing pulses provided in accordance with the standard at the desired level of the IF picture signal, and hence of the picture signal.

As already explained hereinbefore, it is basically important that the two signals applied to the comparator circuit are offset relative to each other by the predetermined value, advantageously by half the nominal amplitude of the synchronizing pulses. In the simplest case, it is sufficient, in accordance with a further embodiment of the invention, that the DC offset circuit raises the DC component of the picture signal by half the nominal amplitude of the synchronizing pulses.

In the simplest case, the variation of the time constant with which the gain control is performed can be realized in dependence upon a simple larger/smaller comparison of the two signals applied to the comparator. Therefore, in accordance with a further embodiment of the invention, the control time constant is increased when the comparison performed by the comparator shows that a synchronizing pulse has a smaller voltage value than the threshold value signal, and that the control time constant is decreased when the comparison shows that a synchronizing pulse has a larger voltage value than the threshold value signal.

It is thereby achieved that, when the IF picture signal at the input of the amplitude demodulator has a level which is clearly too small, i.e., it must undergo a clearly larger amplification as is instantaneously the case, there should be a change-over to a small control time constant. This leads to a rapid adaptation of the gain control so that the gain control can be rapidly increased. Conversely, when the synchronizing pulse in the offset picture signal applied to the comparator has a smaller voltage value than the threshold value signal, i.e., the IF picture signal before the amplitude demodulator already has approximately the nominal level, there should be a change-over to a larger control time constant.

In accordance with a further embodiment of the invention, the black level detector supplies a keying pulse signal which characterizes the synchronizing pulses occurring in the picture signal and is evaluated by the comparator circuit.

As already explained hereinbefore, the comparator circuit should compare the possibly offset threshold value signal with the picture signal applied thereto and possibly provided with a DC offset, and this in such a way that the voltage value of the synchronizing pulses in the picture signal are compared with the voltage value of the threshold value signal.

In other words, this means that the comparison can only take place during the synchronizing pulses of the picture: signal. To determine these instants, it is advantageously possible to evaluate a corresponding keying pulse signal supplied by a black level detector. This requires a very small number of components because known black level detectors, such as, for example, the black level detector described in German Patent DE-C 32 14 756, can generally supply such a keying pulse signal anyway because the synchronizing pulses and the black porches must be recognized in the black level detectors anyway. Thus, this keying pulse signal can be used for the circuit arrangement according to the invention in such a way that the comparator can compare the signals applied thereto only during the desired time intervals in dependence upon this keying pulse signal.

Independent of the fact in what way the comparator circuit is controlled, false comparison results may occur at the edges of the synchronizing pulses of the picture signal due to timing problems. Therefore, in accordance with an advantageous embodiment of the invention, the comparator circuit may be preceded by a low-pass filter by means of which the picture signal is pre-filtered. The edges of the synchronizing pulses are thereby smoothed so that the timing problems at the edges are alleviated.

To increase this effect to a possibly further extent, a further embodiment of the invention is characterized in that the low-pass filter filters the positive edges of the picture signal with a larger time constant than the negative edges. Particularly the trailing edge of the synchronizing pulses is then strongly smoothed.

In accordance with a further embodiment of the invention, a complementary control circuit is also provided which additionally influences the control time constant in such a way that the control time constant is decreased when the voltage value of the synchronizing pulses in the picture signal falls below a predetermined limit value, and that the control time constant is increased when the voltage value of the synchronizing pulses in the picture signal exceeds the predetermined limit value.

This complementary control circuit thus operates in a relatively simple way by means of a comparison of the synchronizing pulses in the picture signals with a predetermined limit value. This complementary control circuit thus has the drawbacks described hereinbefore. Supplementary to the gain control with a variable time constant in accordance with the invention, which gain control does not operate with a fixed comparison value, this circuit arrangement has, however, the advantage that it operates in a reliable manner, even at an extremely small IF picture signal or a picture signal having a synchronizing pulse which can no longer be identified correctly. The time constant may then be decreased by means of this complementary control circuit.

These and other aspects of the invention will be apparent from and elucidated with reference to the embodiments described hereinafter.

DESCRIPTION OF THE PREFERRED EMBODIMENTS

Figure 1:
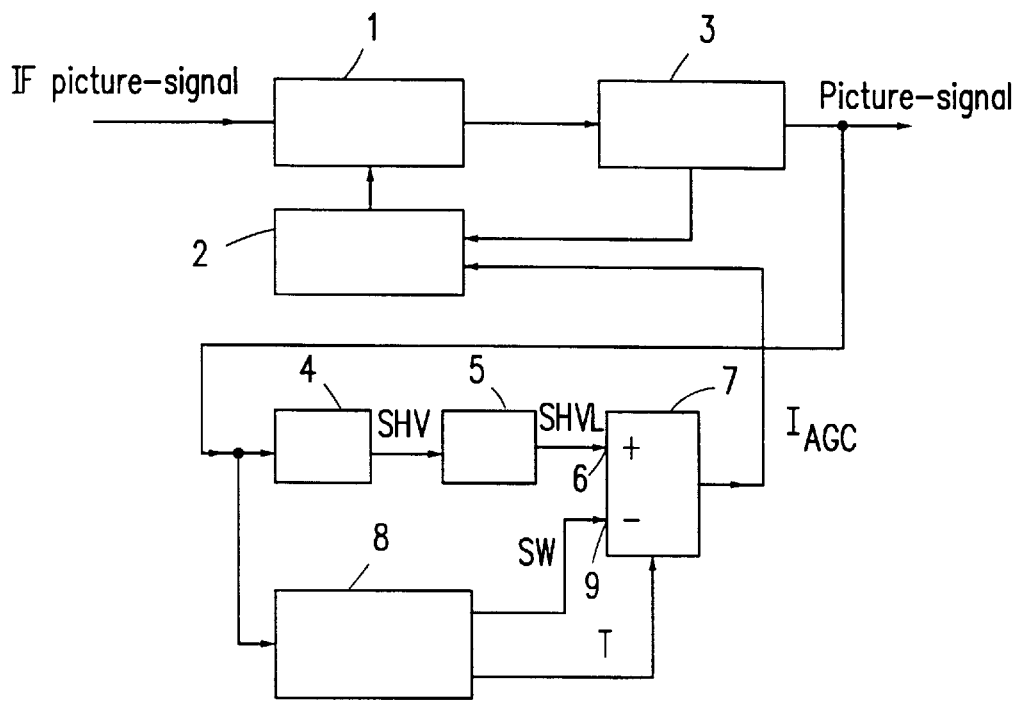
FIG. 1 is a block diagram of an IF demodulator according to the invention, with gain control at a variable time constant.

FIG. 1 is a block diagram of an IF demodulator circuit according to the invention, with gain control at a variable time constant.

This circuit comprises an amplifier arrangement 1 which operates with a variable gain, i.e., a variable gain factor. To change the gain factor, the amplifier arrangement 1 receives a corresponding control signal from a control circuit 2.

The input of the amplifier arrangement 1 receives a picture signal which is amplitude-modulated on an IF carrier. This signal is denoted by picture-IF in the FIG. 1. It is a picture signal which is positively modulated on the IF carrier. Particularly, it may be a SECAM-L signal. Positively modulated means that the picture contents tending towards larger white amplitudes lead to a larger amplitude of the carrier and the synchronizing pulses in the picture signal lead to a smaller amplitude of the IF carrier.

This IF picture signal is amplified in the amplifier arrangement 1. This arrangement has a variable gain factor so that the output of the amplifier arrangement 1 supplies the IF picture signal at a nominal level which ideally is independent of the input level of the IF picture signal.

The amplifier arrangement 1 precedes an IF demodulator 3 which demodulates the IF picture signal so that it is available as a baseband signal, i.e., as a normal picture signal at the output.

In addition to the gain control with a variable time constant according to the invention, to be elucidated hereinafter, the control circuit 2 may be implemented in such a way that the 100% white values occurring in the vertical blanking interval are detected in the output signal of the demodulator 3 and are also used for gain control. This is known from the prior art and does not form part of the invention. This control may be provided in addition to the control according to the invention, but it has the drawback that the corresponding 100% white pulses only occur every 20 msec in the picture signal. This, in turn, requires a large time constant during the gain control so that a rapid readjustment is not possible in this way.

The picture signal from the amplitude demodulator 3 reaches a DC offset circuit 4 in the circuit arrangement. This DC offset circuit 4 offsets the picture signal applied thereto towards positive amplitudes. Thus, the DC component of this signal is quasi-changed. This is effected in such a way that the DC component of the picture signal is increased by half the nominal amplitude of the synchronizing pulses in the picture signal. The nominal amplitude is understood to be the amplitude of the synchronizing pulses at a nominal level of the IF picture signal at the output of the amplifier arrangement 1. This value is known, because the value of the synchronizing pulses is based on the specification of the demodulation arrangement and because the level which the IF picture signal at the output of the amplifier arrangement 1 should have is also known. The half value of the amplitude of the synchronizing pulses determined under these conditions is that value by which the picture signal is offset towards higher amplitudes by means of the offset circuit 4. The output of the offset circuit 4 supplies the corresponding offset signal which is denoted by SHV in FIG. 1.

This signal is applied to a low-pass filter 5 which particularly filters the signal applied thereto in such a way that falling edges are filtered with smaller time constants than rising edges. As a result, particularly the trailing edges of the synchronizing pulses in the picture signal supplied by the circuit 4 are strongly smoothed.

The signal thus filtered, which is denoted by SHVL in FIG. 1, is applied to a positive input 6 of a comparator 7.

The picture signal filtered by the amplitude demodulator 3 is applied to a black level detector circuit 8 within the circuit arrangement. This circuit 8 determines the voltage value of the black level of the picture signal, i.e., the voltage value of the black porches which are temporally available in the picture signal before and after the active picture area. This black level detector circuit 8 operates in known manner, for example, as described in German Patent Specification 32 14 756.

The output of the circuit 8 supplies a signal SW which indicates the voltage value of the black level of the picture signal applied to its input. This signal is applied to an inverting input 9 of the comparator 7.

In circuits which detect the black level of the picture signal, it is always necessary to identify the various signal components of the overall picture signal, i.e., those time intervals in which synchronizing pulses, black level and picture contents occur in the picture signal. This information may be utilized to supply a corresponding keying signal T which indicates the periods of time in which synchronizing pulses occur in the picture signal. This signal T is also applied to the comparator 7 which supplies a comparator signal only during the periods of time in which the signal T indicates a synchronizing pulse in the picture signal, said comparator signal representing a comparison signal of the signals applied to the inputs 6 and 7. This signal is denoted by $I_{AGC}$ in FIG. 1 and is applied to the control circuit 2. During the synchronizing pulses occurring in the picture signal, this signal $I_{AGC}$ indicates whether the signal which is offset by half the nominal value of the amplitude of the synchronizing pulses and is subsequently low-pass filtered, is smaller or larger than the black level of the picture signal SW. Based on this signal, the control circuit 2 changes the time constant with which the control of the gain factor of the amplifier arrangement 1 is readjusted. If the picture signal has relatively small levels, i.e., if the gain is to be clearly increased, the control time constant will be decreased. Conversely, the control time constant is increased. The relevant ratios will be elucidated hereinafter with reference to the time diagram in FIGS. 2A and 2B.

Figure 2A:
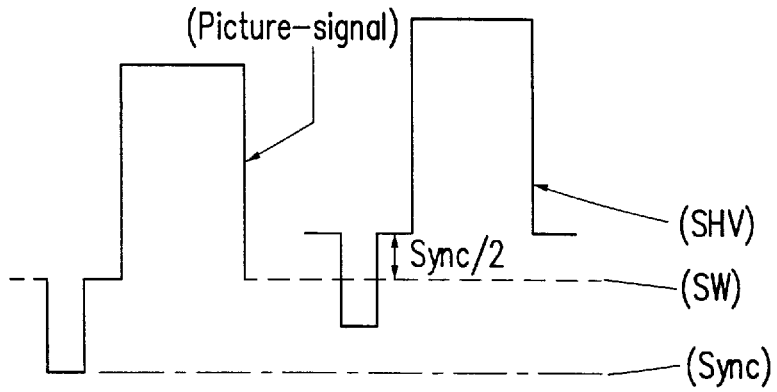
FIGS. 2A and 2B show time diagrams of some signals of the circuit arrangement shown in FIG. 1.

FIG. 2A shows the positive half of the envelope of an IF picture signal. This envelope of the picture signal is shown with respect to time. In this signal, a synchronizing pulse having an amplitude denoted by Sync can be recognized. A black porch having a voltage value SW follows the synchronizing pulse with respect to time. The black porch is followed by the picture contents, here, for example 100%.

Figure 2B:
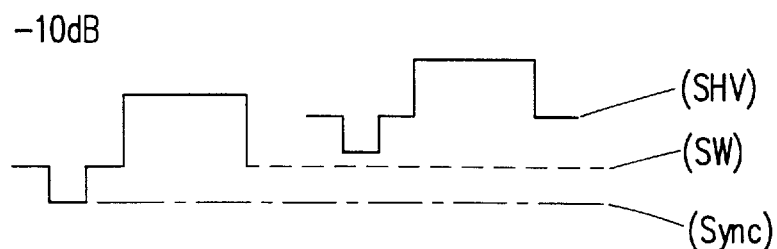

FIG. 2A also shows the corresponding picture signal once more, but this time offset by half the nominal amplitude Sync/2 of the synchronizing pulses to a larger amplitude, i.e., with a corresponding changed DC component denoted by SHV. In FIGS. 2A and 2B, it is assumed that the signal shown has a nominal amplitude so that an offset by half the amplitude of the synchronizing pulses is realized.

FIG. 2A shows that the synchronizing pulse of the offset picture signal SHV falls below the amplitude value SW of the black level of the picture signal which is not offset. In FIG. 1, this means that the output signal of the comparator 7, which is denoted by $I_{AGC}$, supplies the value of zero to the control circuit 2. This is the case when the synchronizing pulse of the picture signal offset by half the nominal amplitude of the synchronizing pulse falls below the black level of the picture signal which is not offset. The control circuit 2 then switches to a large time constant because the picture signal already has approximately the nominal level and thus no longer requires a rapid control.

However, the situation is different in FIG. 2B. Here again, a picture signal with a synchronizing pulse, a black porch and active picture contents is shown symbolically. This signal is again offset by half the nominal amplitude of the synchronizing pulse. In this case it should be noted that this is the nominal amplitude instead of the actual amplitude of the synchronizing pulse. The nominal amplitude is herein understood to mean the amplitude which the synchronizing pulse should have at the nominal level of the picture signal.

The synchronizing pulse of the picture signal in FIG. 2B has, however, a smaller amplitude value than the value which would correspond to the nominal amplitude value of the synchronizing pulse. Nevertheless, the picture signal is offset by half the nominal amplitude value of the synchronizing pulse. The corresponding signal is also denoted by SHV in FIG. 2. FIG. 2B shows that the synchronizing pulse in the offset picture signal exceeds the voltage value of the black level SW of the picture signal which is not offset. This is caused by the fact that the amplitude of the overall picture signal is clearly too small. The comparator 7 supplies a corresponding signal in the output signal $I_{AGC}$ to the control circuit as shown in FIG. 1. The control circuit 2 then switches over to a smaller time constant so that the clearly too small value of the level of the picture signal as shown in FIG. 2B can be corrected in a relatively rapid manner.

Thus, a switch-over of the gain control time constant is achieved in dependence upon the values of the level of the picture signal, this switch-over being independent of a possible DC offset of the picture signal applied from the amplitude demodulator to the input. This is achieved in that the black level of the signal which is not offset is compared with the voltage value of the synchronizing pulses of the offset signal. Consequently, this comparison is independent of external threshold values and independent of the absolute offset position of the picture signal.

Figure 3:
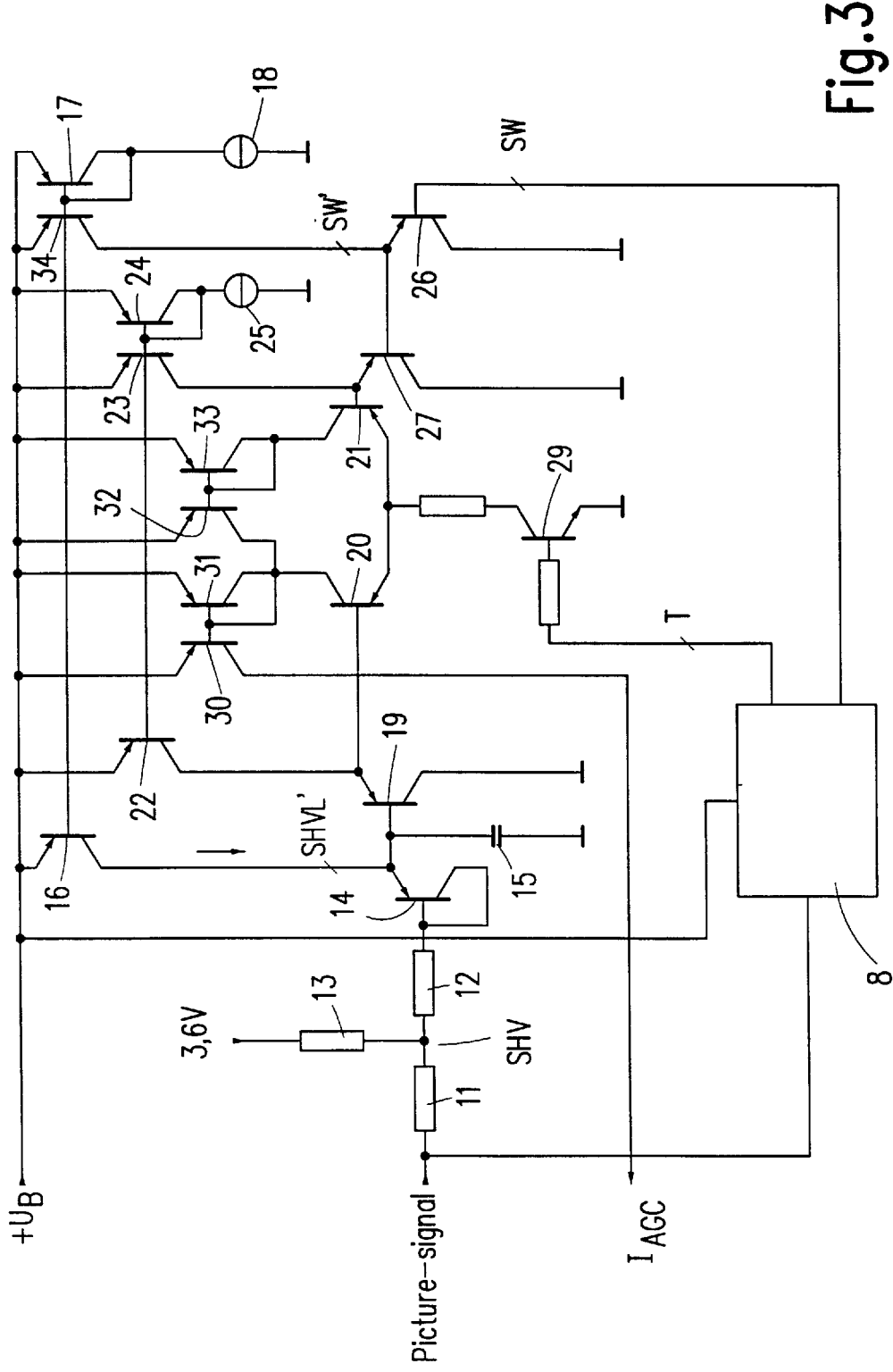
FIG. 3 is a more detailed, partial representation of the circuit arrangement shown in FIG. 1.

FIG. 3 shows a detailed circuit diagram of parts of the circuit arrangement of FIG. 1. Particularly, the offset circuit 4, the low-pass filter 5 and the comparator 7 are shown in greater detail. The black level detector circuit 8 is shown only as a circuit block in FIG. 3, in conformity with the representation in FIG. 1. It may be particularly implemented as described in German Patent Specification 32 14 756.

The picture signal is applied to the input of the circuit shown in FIG. 3. The overall circuit arrangement is supplied with a reference potential (ground) and a supply potential $U_B$.

The picture signal applied to the input of the circuit arrangement shown in FIG. 3 is applied to the series arrangement of two resistors 11 and 12 whose junction point is connected via a resistor 13 to a positive potential, particularly, a potential of 3.6 volts. An offset of the DC component of the picture signal towards a positive amplitude is realized by means of the resistors 11, 12, 13. The resistor 12 precedes a transistor 14 arranged as a diode whose emitter at the output is coupled to the reference potential via a capacitance 14. The impedance constituted by the arrangement of the resistors 11, 12 and 13 in connection with the value of the capacitance 15 determines the low-pass behavior of this part of the circuit arrangement and determines the decay time, i.e., the time constant at the negative edges of the picture signal. The time constant at the positive edges, i.e., the rise time, is determined by the current which a further transistor 16 can provide. Moreover, the rise time is also dependent on the value of the capacitance 15.

Together with a further transistor 17, the transistor 16 is constituted as a current mirror circuit which mirrors a current at the junction point of transistor 14 and capacitance 15, this current being supplied by a current source 18 and having a value of, for example, 0.13 μA.

Due to the low-pass behavior thus created, the low-pass filtered signal SHVL, as shown in FIG. 1, is available at the junction point of transistor 14 and capacitance 15.

This signal is applied, via a transistor 19 arranged as a voltage follower, to a comparator which is constituted by two transistors 20, 21.

A further current mirror circuit with transistors 22, 23 and 24 is provided, which applies a current from a current source 25 to the two inputs of the comparator circuit constituted by the transistors 21 and 22, this current source supplying a current of, for example approximately 3 μA.

The black level signal SW, which has previously passed through transistors 26 and 27, is applied to the other input of the comparator circuit constituted by the transistors 20 and 21. The current mirror circuit constituted by the transistors 17 and 34 applies the current from the current source 18 to the emitter of the transistor 26 by means of a transistor 34. The current from the current source 25 is applied to the emitter of the transistor 27 via the transistors 23 and 24 constituting a current mirror circuit.

Thus, the black level SW of the picture signal which is not offset is compared with the picture signal which is offset by half the nominal amplitude value of the synchronizing pulses in the comparator circuit constituted by the transistors 20 and 21.

Since this comparison is only performed during the synchronizing pulses occurring in the picture signal, the black level detector 8 supplies a corresponding keying signal T, in dependence upon which the comparator is connected to reference potential by means of a transistor 29.

The output signal of the comparator is applied as a comparison signal, denoted as $I_{AGC}$, to the control circuit 2 of the arrangement of FIG. 1 via transistors 30, 31, 32 and 33, two of which are each arranged as current mirror circuits. The current mirror circuit constituted by the transistors 32 and 33 mirrors the current of the collector of the transistor 21 with respect to the collector of the transistor 20. Its current is, in turn, imaged in the output signal $I_{AGC}$ of the circuit arrangement via the current mirror circuit constituted by the transistors 30 and 31. This signal is the comparison signal between the black level of the picture signal which is not offset and the amplitude of the synchronizing pulses of the picture signal which is offset by half the nominal amplitude value of the synchronizing pulses. This comparison signal $I_{AGC}$ is used for switching the control time constant of the gain control in accordance with FIG. 1 and the corresponding explanation of this Figure.

In FIG. 3, some signals are offset within the circuit as far as their potential is concerned. These signals are primed. For example, the black level SW' behind the transistor 26 is denoted by SW. The low-pass filtered signal occurs as SHVL' signal at the junction point of transistor 14 and capacitance 15.

Figures 4A, 4B:
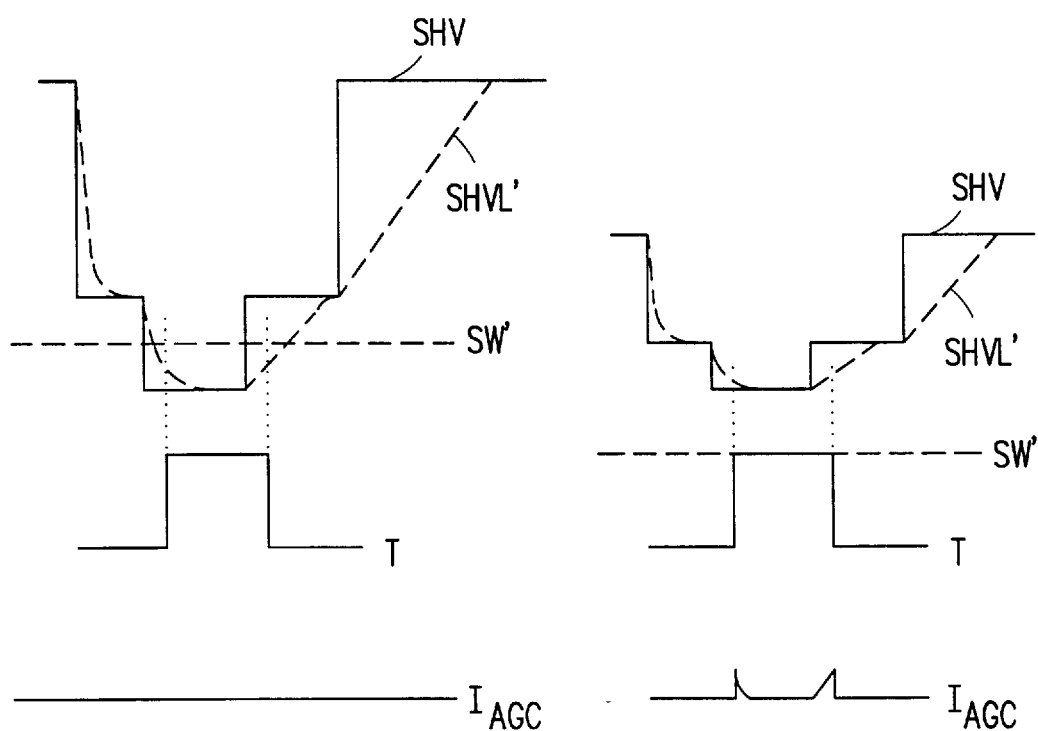
FIGS. 4A and 4B show some time diagrams of the circuit arrangement shown in FIGS. 1 and 3.

FIGS. 4A and 4B show two time diagrams, by way of example, representing variations with respect to time of signals occurring in the circuit arrangement shown in FIG. 3. FIG. 4A shows a video signal SHV which is already offset by half the nominal amplitude value of the synchronizing pulses as far as its DC component is concerned. This signal occurs in a low-pass filtered form as signal SHVL' at the junction point between the transistor 14 and the diode 15. FIG. 4A shows that the decay times are filtered with a smaller time constant than the rising edges. This is achieved in the manner described hereinbefore in that the decay time in the circuit arrangement of FIG. 3 is determined by the values of the resistors 11 to 13 and the capacitance 15, while the rise time is determined by the current supplied by the current mirror circuit 16, 17 and the value of the capacitance 15.

Due to the smoothing, particularly, at the positive edges of the synchronizing pulse in FIG. 4A, it is achieved that the comparison between the voltage value of the synchronizing pulse of the offset picture signal SHV and the black level SW' should not be performed exactly during the synchronizing pulse.

As is also shown in FIGS. 2A and 2B, the keying signal T supplied by the black level detector 8 occurs with a small temporal delay, i.e., the pulse in the keying signal T occurs slightly later than the synchronizing pulse in the picture signal SHV which is offset as regards its DC component. However, due to the use of the low-pass filtering circuit, it is achieved that the keying signal T can nevertheless be utilized for keying the comparator. As is shown in FIGS. 4A and 4B, the amplitude of the synchronizing pulse of the offset picture signal falls below the amplitude of the black level SW'. In spite of the slightly offset pulse in the keying signal T, it is recognized correctly, i.e., the low-pass filtered signal SHVL' falls below the voltage value of the black level signal SW' during the time interval of the pulse of the keying signal T. Accordingly, the circuit arrangement shown in FIG. 3, i.e., particularly the comparator constituted by the transistors 20 and 21, does not supply an output signal during this time interval.

FIG. 4B is similar to FIG. 4A, but the level value of the picture signal SHV is clearly smaller. Nevertheless, this signal is offset by half the nominal amplitude value of the synchronizing pulses in FIG. 4B. FIG. 4B shows that the low-pass filtered signal SHVL', i.e., the low-pass filtered picture signal offset by half the nominal amplitude value of the synchronizing pulses, exceeds the voltage value of the black level signal SW' during the keying pulse occurring in the keying signal T in several time intervals, particularly at the beginning and at the end of this keying pulse. During these time intervals, the comparator constituted by the transistors 20 and 21 of the circuit arrangement shown in FIG. 3 supplies an output signal $I_{AGC}$ which comprises positive pulses during these intervals.

In the circuit arrangement of FIG. 1, these pulses are applied to the control circuit 2 which, in conformity with these pulses, decreases the control time constant. In conformity with the signal value of the picture signal in FIG. 4B, this is sensible because the picture signal has too small level values so that a rapid gain control is required to bring the picture signal to nominal level values as rapidly as possible. At even smaller level values of the picture signal, the comparator supplies an output signal $I_{AGC}$ during the entire period T.

In addition to this arrangement according to the invention, a further complementary control circuit may be provided which is not shown in any of the Figures. Moreover, this complementary control circuit may influence the control time constant of the gain control. It may be implemented in such a way that it decreases the control time constant when the voltage value SW of the picture signal black level detected by the black level detector 8 falls below a fixed, predetermined limit value and that it increases the control time constant when the voltage value exceeds the predetermined limit value. This particularly also ensures a control or readjustment of the control time constant when the picture signal may have extremely small level values at which, under circumstances, synchronizing pulses are no longer detectable, which has the result that the black level detector circuit can neither supply any keying pulses. Then there is no longer any comparison in the comparator so that, under circumstances, the circuit arrangement according to the invention does not supply an output signal during this time interval. The complementary control circuit may then perform a control during this time interval. As soon as the control has started, the level value of the IF picture signal increases relatively rapidly so that the control circuit according to the invention is activated.

I claim:

1. An IF demodulator circuit with IF gain control at a variable time constant, said IF demodulator circuit receiving an IF carrier, comprising synchronizing pulses, a black porch and picture information with a positively modulated picture signal, and amplifying the IF picture signal to a nominal amplitude value by means of the IF gain control, said IF demodulator circuit comprising an IF demodulator for demodulating the IF picture signal and for supplying a picture signal from an output, characterized in that said IF demodulator circuit further comprises a black level detector for generating a black level signal used as a threshold value signal in conformity with an amplitude value of the black porch of the picture signal supplied by the IF demodulators; a DC offset circuit for raising a DC component of the picture signal and/or lowering a DC component of the threshold value signal in such a way that both signals are offset by a predetermined value relative to each other; and a comparator circuit for receiving the two signals which are offset relative to each other, the comparator circuit comparing a voltage value of the synchronizing pulses occurring in the picture signal with a voltage value of the threshold value signal, and supplying a comparison signal in dependence upon this comparison, the variable time constant of the gain control being changed in dependence on said comparison signal.

2. An IF demodulator circuit as claimed in claim 1, characterized in that the DC offset circuit offsets the threshold value signal and the picture signal relative to each other by half a nominal amplitude of the synchronizing pulses.

3. An IF demodulator circuit as claimed in claim 1, characterized in that the DC offset circuit raises the DC component of the picture signal by half a nominal amplitude of the synchronizing pulses.

4. An IF demodulator circuit as claimed in claim 1, characterized in that the variable time constant of the gain control is increased when the comparison performed by the comparator shows that a synchronizing pulse falls below the threshold value signal, and that the variable time constant of the gain control is decreased when the comparison shows that a synchronizing pulse exceeds the threshold value signal.

5. An IF demodulator circuit as claimed in claim 1, characterized in that the black level detector supplies a keying pulse signal which characterizes the synchronizing pulses occurring in the picture signal, said keying pulse signal being evaluated by the comparator circuit.

6. An IF demodulator circuit as claimed in claim 1, characterized in that the comparator circuit is preceded by a low-pass filter for pre-filtering the picture signal.

7. An IF demodulator circuit as claimed in claim 6, characterized in that the low-pass filter (5) filters positive edges of the picture signal with a larger time constant than negative edges.

8. An IF demodulator circuit as claimed in claim 1, characterized in that said IF demodulator circuit further comprises a complementary control circuit for additionally influencing the variable time constant of the gain control in such a way that the variable time constant is decreased when a voltage value of the picture signal black level detected by the black level detector falls below a predetermined limit value, and the variable time constant is increased when this voltage value exceeds the predetermined limit value.

9. A television tuner including an IF demodulator circuit with gain control at a variable time constant, said IF demodulator circuit receiving an IF carrier, comprising synchronizing pulses, a black porch and picture information with a positively modulated picture signal, and amplifying the IF picture signal to a nominal amplitude value by means of the IF gain control, said IF demodulator circuit comprising an IF demodulator for demodulating the IF picture signal and for supplying a picture signal from an output, characterized in that said IF demodulator circuit further comprises a black level detector for generating a black level signal used as a threshold value signal in conformity with an amplitude value of the black porch of the picture signal supplied by the IF demodulator; a DC offset circuit for raising a DC component of the picture signal and/or lowering a DC component of the threshold value signal in such a way that both signals are offset by a predetermined value relative to each other; and a comparator circuit for receiving the two signals which are offset relative to each other, the comparator circuit comparing a voltage value of the synchronizing pulses occurring in the picture signal with a voltage value of the threshold value signal, and supplying a comparison signal in dependence upon this comparison, the variable time constant of the gain control being changed in dependence on said comparison signal.

10. A picture display device including a television tuner which is provided with an IF demodulator circuit with gain control at a variable time constant, said IF demodulator circuit receiving an IF carrier, comprising synchronizing pulses, a black porch and picture information with a positively modulated picture signal, and amplifying the IF picture signal to a nominal amplitude value by means of the IF gain control, said IF demodulator circuit comprising an IF demodulator for demodulating the IF picture signal and for supplying a picture signal from an output, characterized in that said IF demodulator circuit further comprises a black level detector for generating a black level signal used as a threshold value signal in conformity with an amplitude value of the black porch of the picture signal supplied by the IF demodulator; a DC offset circuit for raising a DC component of the picture signal and/or lowering a DC component of the threshold value signal in such a way that both signals are offset by a predetermined value relative to each other; and a comparator circuit for receiving the two signals which are offset relative to each other, the comparator circuit comparing a voltage value of the synchronizing pulses occurring in the picture signal with a voltage value of the threshold value signal, and supplying a comparison signal in dependence upon this comparison, the variable time constant of the gain control being changed in dependence on said comparison signal.

\* \* \* \* \*